US012806111B2

(12) United States Patent
So et al.

(10) Patent No.: US 12,806,111 B2
(45) Date of Patent: Nov. 24, 2026

(54) MOTION ASSIST DEVICE

(71) Applicant: SAMSUNG ELECTRONICS CO., LTD., Suwon-si (KR)

(72) Inventors: Yongho So, Suwon-si (KR); Bola Park, Suwon-si (KR); Jiyun Park, Suwon-si (KR); Huu Lam Vuong Nguyen, Suwon-si (KR); Jeonghan Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 18/747,069

(22) Filed: Jun. 18, 2024

(65) Prior Publication Data

US 2024/0335346 A1 Oct. 10, 2024

Related U.S. Application Data

(63) Continuation of application No. PCT/KR2023/018530, filed on Nov. 17, 2023.

(30) Foreign Application Priority Data

Dec. 9, 2022 (KR) ........................ 10-2022-0171469
Jan. 27, 2023 (KR) ........................ 10-2023-0011231

(51) Int. Cl.
*A61H 3/00* (2006.01)

(52) U.S. Cl.
CPC ......... *A61H 3/00* (2013.01); *A61H 2003/007* (2013.01); *A61H 2201/1626* (2013.01); *A61H 2201/1642* (2013.01)

(58) Field of Classification Search
CPC ................ A61H 3/00; A61H 2003/007; A61H 2201/1626; A61H 2201/1642
See application file for complete search history.

(56) References Cited

U.S. PATENT DOCUMENTS 7,780,616 B2 * 8/2010 Katoh ...................... A61H 3/00 601/5
8,784,344 B2 7/2014 Takahashi et al.
(Continued)

FOREIGN PATENT DOCUMENTS

JP 2005-000634 A 1/2005
JP 2010-000205 A 1/2010
(Continued)

OTHER PUBLICATIONS

PCT International Search Report dated Feb. 26, 2023 for PCT/KR2023/018530.
WOSA dated Feb. 26, 2023 for PCT/KR2023/018530.

*Primary Examiner* — Adam C Ortiz
(74) *Attorney, Agent, or Firm* — Nixon & Vanderhye P.C.

(57) ABSTRACT

A motion assist device is provided. The motion assist device may include a base body configured to support a back of a user, connection frames connected to the base body, driving modules connected to the connection frames and configured to generate power to assist motion of the user, leg frames rotatably connected to the driving modules and rotated by receiving power from the driving modules, waist frames connected to the driving modules, waist belts connected to the waist frames, an auxiliary part detachably provided to the waist belts, in close contact with a waist of the user, and configured to press the waist of the user.

19 Claims, 7 Drawing Sheets

(56) References Cited

U.S. PATENT DOCUMENTS

| | | | |
|---|---|---|---|
| 2011/0160626 | A1 | 6/2011 | Takahashi et al. |
| 2021/0346229 | A1 | 11/2021 | Yagi |

FOREIGN PATENT DOCUMENTS

| | | | |
|---|---|---|---|
| JP | 2021-094654 | A | 6/2021 |
| KR | 10-2019-0099918 | A | 8/2019 |
| KR | 20190108858 | A | 9/2019 |
| KR | 20190109191 | A | 9/2019 |
| KR | 10-2021-0088129 | A | 7/2021 |
| KR | 20220002042 | A | 1/2022 |

* cited by examiner

MOTION ASSIST DEVICE

CROSS-REFERENCE TO RELATED APPLICATIONS

This application is a continuation application of International Application No. PCT/KR2023/018530 designating the United States, filed on Nov. 17, 2023, in the Korean Intellectual Property Receiving Office and claiming priority to Korean Patent Application No. 10-2022-0171469, filed on Dec. 9, 2022, and to Korean Patent Application No. 10-2023-0011231, filed on Jan. 27, 2023, in the Korean Intellectual Property Office, the disclosures of which are all hereby incorporated by reference herein in their entireties.

BACKGROUND

1. Field

Certain example embodiments relate to a motion assist device.

2. Description of Related Art

A change into aging societies has contributed to a growing number of people who experience inconvenience and pain from reduced muscular strength or joint problems due to aging. Thus, there is a growing interest in walking assist devices, or other exercise assist devices, that enable elderly users or patients with reduced muscular strength or joint problems to walk and/or exercise with less effort.

SUMMARY

According to an example embodiment, a wearable motion assist device may include a base body configured to support a back of a user, connection frames connected, directly or indirectly, to the base body, driving modules connected, directly or indirectly, to the connection frames and configured to generate power to assist motion of the user, leg frames rotatably connected, directly or indirectly, to the driving modules and rotated by receiving power from the driving modules, waist frames connected, directly or indirectly, to the driving modules, waist belts connected, directly or indirectly, to the waist frames, and an auxiliary part detachably connected, directly or indirectly, to the waist belts, in close contact with a waist of the user, and configured to press the waist of the user.

According to an example embodiment, a motion assist device may include a base body configured to support a back of a user, connection frames connected to the base body, driving modules connected to the connection frames and configured to generate power to assist motion of the user, waist frames connected to the driving modules, and an auxiliary part including an auxiliary frame detachably provided on an inner surface of the waist frames, waist cushions disposed on the auxiliary frame and configured to press a waist of the user, and a waist band extending from the auxiliary frame, connected to the base body, and in close contact with the waist of the user.

BRIEF DESCRIPTION OF THE DRAWINGS

The above and other aspects, features, and advantages of certain example embodiments of the present disclosure will be more apparent from the following detailed description, taken in conjunction with the accompanying drawings, in which.

DETAILED DESCRIPTION

Figure 1:
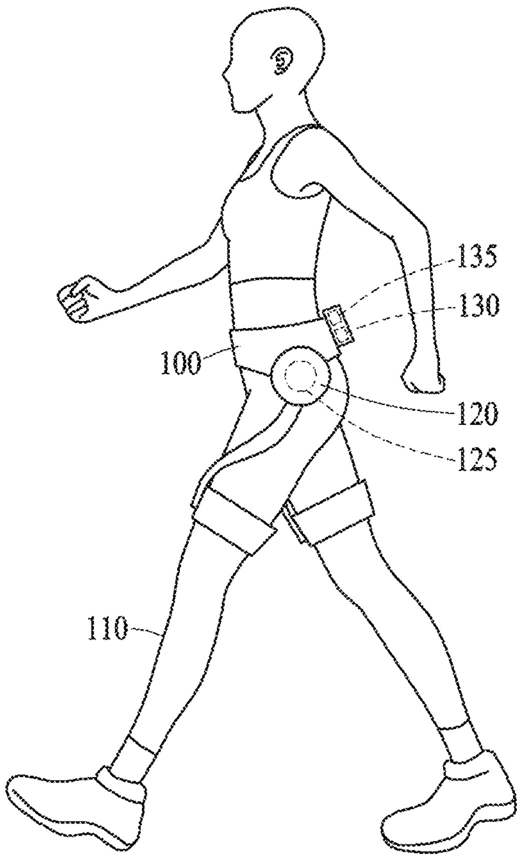
FIG. 1 is a diagram illustrating an overview of a motion assist device worn on the body of a user according to an example embodiment.

The following detailed structural or functional description is provided as an example only and various alterations and modifications may be made to examples. Accordingly, the embodiments are not construed as limited to the disclosure and should be understood to include all changes, equivalents, and replacements within the idea and the technical scope of the disclosure.

As used herein, the singular forms "a", "an", and "the" include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples will be described in detail with reference to the accompanying drawings. When describing the embodiments with reference to the accompanying drawings, like reference numerals refer to like elements and any repeated description related thereto will be omitted.

FIG. 1 is a diagram illustrating an overview of a motion assist device worn on the body of a user according to an embodiment.

Referring to FIG. 1, in an embodiment, a wearable device 100 may be a device worn on the body of a user 110 to assist the user 110 in walking, exercising, and/or working. In an embodiment, the wearable device 100 may be used to measure a physical ability (e.g., a walking ability, an exercise ability, or an exercise posture) of the user 110. In the embodiments, the term "wearable device" may be replaced with a "wearable robot," a "walking assist device," or a "motion assist device". The user 110 may be a human or an animal but is not limited thereto. The wearable device 100 may be worn on the body (e.g., the lower body (legs, ankles, knees, etc.), the upper body (the torso, arms, wrist, etc.), or the waist) of the user 110 and apply external force, such as the assistance force and/or resistance force, to the body motion of the user 110. The assistance force may be the force assisting the body motion of the user 110, which is applied in the same direction as a direction of the body motion of the user 110. The resistance force may be the force impeding the body motion of the user 110, which is applied in an opposite direction to the direction of the body motion of the user 110. The term "resistance force" may be also referred to as the "exercise load".

In an embodiment, the wearable device 100 may operate in a walking assistance mode for assisting the walking of the user 110. In the walking assistance mode, the wearable device 100 may assist the walking of the user 110 by applying the assistance force generated through a driving module 120 of the wearable device 100 to the body of the user 110. The wearable device 100 may expand the walking ability of the user 110 by allowing the user 110 to walk independently or walk for a long time by providing the force needed for the walking of the user 110. The wearable device 100 may also improve the walking of a user having an abnormal walking habit or posture.

In an embodiment, the wearable device 100 may operate in an exercise assistance mode to enhance the effect of an exercise on the user 110. In the exercise assistance mode, the wearable device 100 may impede the body motion of the user 110 or resist against the body motion of the user 110 by applying the resistance force generated through the driving module 120 to the body of the user 110. When the wearable device 100 is a hip-type wearable device worn on the waist (or the pelvis) of the user 110 and the legs (e.g., the thighs) of the user 110, the wearable device 100 worn on the legs of the user 110 may enhance the effect of an exercise on the legs of the user 110 by providing an exercise load to the motion of the legs of the user 110. In an embodiment, the wearable device 100 may apply the assistance force to the body of the user 110 to assist the exercise of the user 110. For example, when a person with disabilities or an elderly person wears the wearable device 100 to exercise, the wearable device 100 may provide the assistance force to assist the body motion in an exercise process. In an embodiment, the wearable device 100 may provide a combination of the assistance force and the resistance force by exercise sessions or time intervals, for example, providing the assistance force in one exercise session and the resistance force in another exercise session.

In an embodiment, the wearable device 100 may operate in a physical ability measurement mode to measure the physical ability of the user 110. The wearable device 100 may measure motion information of a user using sensors (e.g., an angle sensor 125 and an inertial measurement unit (IMU) 135) provided in the wearable device 100 while the user is walking or exercising, and evaluate the physical ability of the user based on the measured motion information. For example, a gait index or an exercise ability indicator (e.g., the muscular strength, endurance, balance, or exercise motion) of the user 110 may be estimated through the motion information of the user, measured by the wearable device 100. The physical ability measurement mode may include an exercise motion measurement mode to measure the exercise motion of a user.

In various embodiments, for convenience of description, the wearable device 100 is described as an example of a hip-type wearable device, as shown in FIG. 1, but the embodiments are not limited thereto. As described above, the wearable device 100 may be worn on body parts (e.g., the upper arms, lower arms, hands, calves, or feet) other than the waist and the legs (specifically, the thighs), and the shape and configuration of the wearable device 100 may vary depending on the body parts on which the wearable device 100 is worn.

Figure 3:
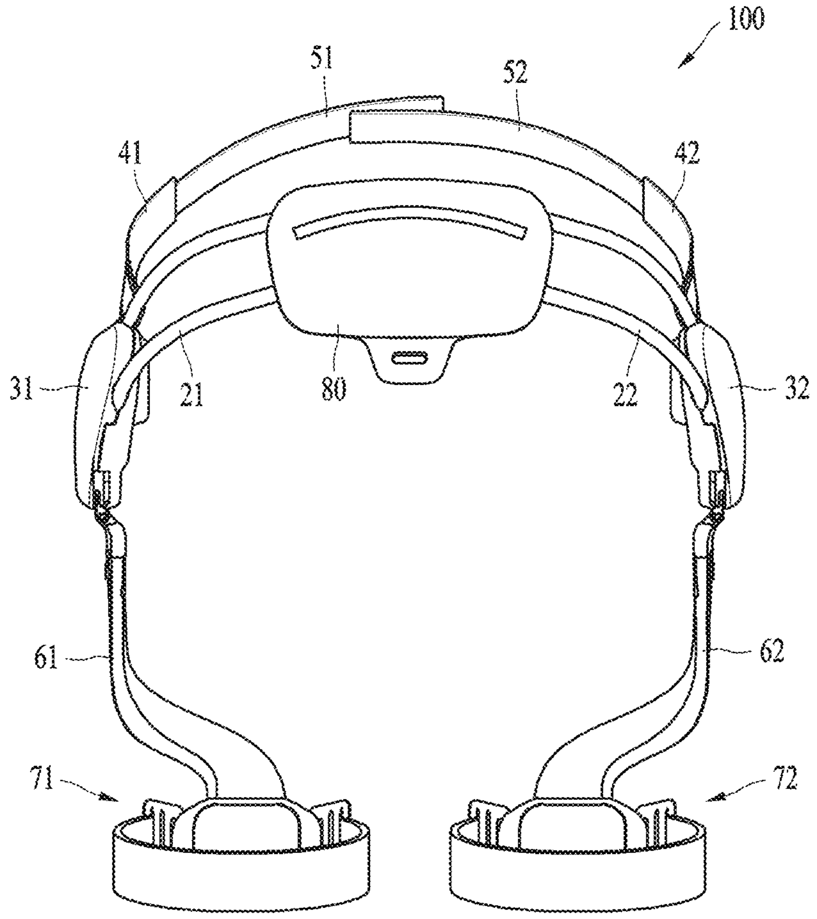
FIG. 3 is a rear schematic diagram of the motion assist device according to an example embodiment.

According to an embodiment, the wearable device 100 may include a support frame (e.g., leg frames 61 and 62 and connection frames 21 and 22 of FIG. 3) to support the body motion of the user 110 when the wearable device 100 is worn on the body of the user 110, a sensor module configured to obtain sensor data including motion information on the body motion (e.g., the leg motion and the upper body motion) of the user 110, the driving module 120 (e.g., driving modules 31 and 32 of FIG. 3) configured to generate a torque to be applied to the legs of the user 110, and a control module 130 configured to control the wearable device 100. Each "driving module" herein may comprise a motor and/or circuitry.

The wearable device 100 may include the angle sensor 125 for measuring a joint angle of a user and the IMU 135 for measuring a change in acceleration and rotational speed according to the body motion of the user 110. The angle sensor 125 may measure a rotation angle (or the angular velocity) of a leg frame of the wearable device 100 corresponding to a hip joint angle value of the user 110. The rotation angle of the leg frame, measured by the angle sensor 125, may be estimated as the hip joint angle value (or a leg angle value) of the user 110. The angle sensor 125 may include, for example, an encoder and/or a hall sensor. In an embodiment, the angle sensor 125 may be near each of the right hip joint and the left hip joint of the user 110. The IMU 135 may include an acceleration sensor and/or an angular velocity sensor (e.g., a gyro sensor) and may measure a change in acceleration and/or angular velocity (or rotational speed) according to the motion of the user 110. The IMU 135 may measure, for example, an upper body motion value of the user 110 corresponding to a motion value of a connection frame (or a base body (a base body 80 of FIG. 3)) of the wearable device 100. The motion value of the connection frame, measured by the IMU 135, may be estimated as the upper body motion value of the user 110. The "IMU" may also be referred to as an "inertial sensor" herein.

In an embodiment, the control module 130 and the IMU 135 may be disposed in a base body (e.g., the base body 80 of FIG. 3) of the wearable device 100. The base body may be on the lumbar region (or the waist) of the user 110 when the user 110 wears the wearable device 100. The base body may be formed on or attached to the outside of the connection frame of the wearable device 100. The base body may be mounted on the lumbar region of the user 110 to provide a cushioning feeling to the waist of the user 110 and may support the waist of the user 110 with the connection frame.

Figure 2:
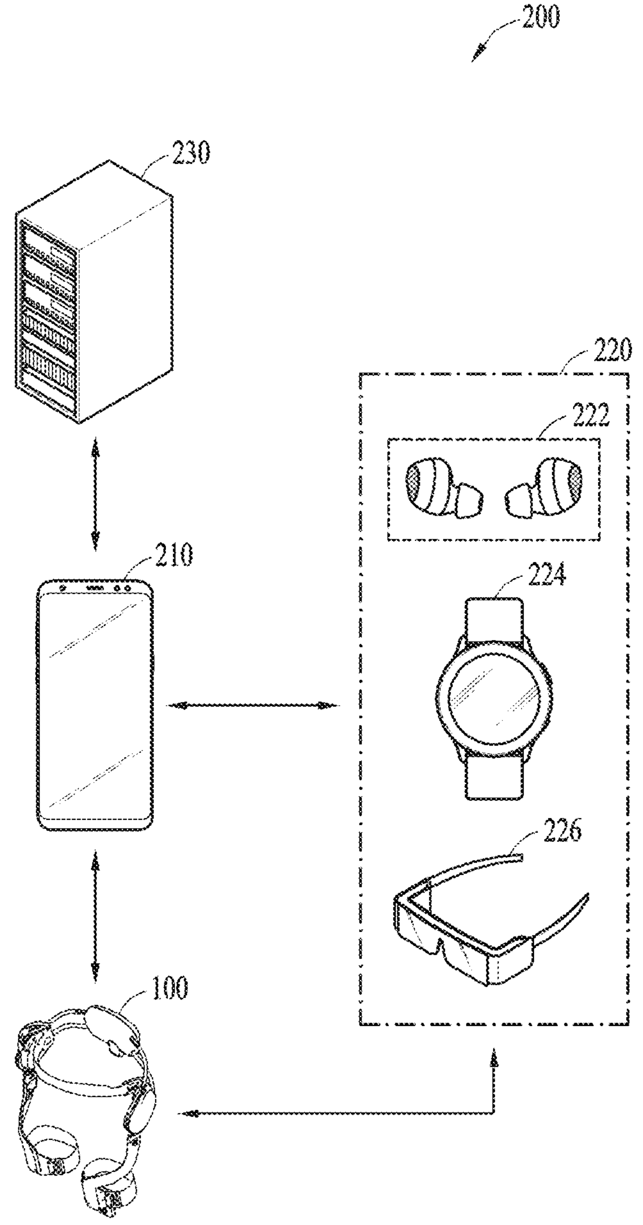
FIG. 2 is a diagram illustrating a motion management system including the motion assist device and an electronic device, according to an example embodiment.

FIG. 2 is a diagram illustrating a motion management system including the motion assist device and an electronic device, according to an embodiment.

Referring to FIG. 2, a motion management system 200 may include the wearable device 100 worn on the body of a user, an electronic device 210, other wearable devices 220, and a server 230. In an embodiment, at least one (e.g., the other wearable devices 220 or the server 230) of these devices may be omitted from the motion management system 200, or one or more other devices (e.g., an exclusive controller device of the wearable device 100) may be added to the motion management system 200.

In an embodiment, the wearable device 100 may be worn on the body of the user in the walking assistance mode to assist the motion of the user. For example, the wearable device 100 worn on the legs of the user may assist the user in walking by generating the assistance force to assist the motion of the legs of the user.

In an embodiment, to enhance the effect of an exercise on the user in an exercise assistance mode, the wearable device 100 may generate the resistance force to impede the body motion of the user or the assistance force to assist the body motion of the user and apply such a force to the body of the user. In the exercise assistance mode, through the electronic device 210, the user may select exercise programs (e.g., squat, split lunge, dumbbell squat, lunge and knee up, stretching, etc.) that the user desires to do for exercise using the wearable device 100 and/or the exercise intensity to be applied to the wearable device 100. The wearable device 100 may control a driving module of the wearable device 100 according to the exercise program selected by the user and obtain sensor data including motion information of the user through a sensor module. The wearable device 100 may adjust the intensity of the resistance force or the assistance force applied to the user according to the exercise intensity selected by the user. For example, the wearable device 100 may control the driving module to generate the resistance force corresponding to the exercise intensity selected by the user.

In an embodiment, the wearable device 100 may be used to measure the physical ability of the user by interoperating with the electronic device 210. The wearable device 100 may operate in a physical ability measurement mode, which is a mode for measuring the physical ability of the user, under the control of the electronic device 210, and may transmit sensor data obtained by the motion of the user in the physical ability measurement mode to the electronic device 210. The electronic device 210 may estimate the physical ability of the user by analyzing the sensor data received from the wearable device 100.

The electronic device 210 may communicate with the wearable device 100 and may remotely control the wearable device 100 or provide the user with state information on a state (e.g., a booting state, a charging state, a sensing state, or an error state) of the wearable device 100. The electronic device 210 may receive sensor data obtained by a sensor of the wearable device 100 from the wearable device 100 and estimate the physical ability of the user or an exercise result based on the received sensor data. In an embodiment, when the user exercises wearing the wearable device 100, the wearable device 100 may obtain the sensor data including motion information of the user using sensors and transmit the obtained sensor data to the electronic device 210. The electronic device 210 may extract a motion value of the user from the sensor data and evaluate an exercise posture of the user based on the extracted motion value. The electronic device 210 may provide the user with an exercise posture measurement value and exercise posture evaluation information on the exercise posture of the user through a graphical user interface (GUI).

In an embodiment, the electronic device 210 may execute a program (e.g., an application) to control the wearable device 100 and the user, through the program, may adjust an operation of the wearable device 100, the intensity of a torque output from a set value (e.g., a driving module (e.g., the driving modules 31 and 32 of FIG. 3)), the volume of audio output from a sound output module, and a light unit. The program executed by the electronic device 210 may provide a GUI for interaction with the user. The electronic device 210 may be a device in various forms. For example, the electronic device 210 may include a portable communication device (e.g., a smartphone), a computer device, an access point, a portable multimedia device, or a home appliance (e.g., a television, an audio device, or a projector device), but examples are not limited to the foregoing devices.

According to an embodiment, the electronic device 210 may be connected to the server 230 using short-range wireless communication or cellular communication. The server 230 may receive user profile information of a user using the wearable device 100 from the electronic device 210 and store and manage the received user profile information. The user profile information may include, for example, at least one of a name, age, gender, height, weight, and body mass index (BMI). The server 230 may receive exercise history information on an exercise performed by the user from the electronic device 210 and may store and manage the received exercise history information. The server 230 may provide the electronic device 210 with various exercise programs or physical ability measurement programs to be provided to the user.

In an embodiment, the wearable device 100 and/or the electronic device 210 may be connected to the other wearable devices 220. The other wearable devices 220 may include, for example, wireless earphones 222, a smartwatch 224, or smart glasses 226, but examples are not limited to the foregoing devices. In an embodiment, the smartwatch 224 may measure a bio signal including heart rate information of the user and may transmit the measured bio signal to the electronic device 210 and/or the wearable device 100. The electronic device 210 may estimate the heart rate information (e.g., a current heart rate, the maximum heart rate, or an average heart rate) of the user based on the bio signal received from the smartwatch 224 and provide the estimated heart rate information to the user.

In an embodiment, the exercise result information, physical ability information (e.g., the walking evaluation information), and/or exercise posture evaluation information evaluated by the electronic device 210 may be transmitted to the other wearable devices 220 and provided to the user through the other wearable devices 220. The state information of the wearable device 100 may be transmitted to the other wearable devices 220 and provided to the user through the other wearable devices 220. In an embodiment, the wearable device 100, the electronic device 210, and the other wearable devices 220 may be connected to one another through wireless communication (e.g., Bluetooth™ or wireless fidelity (Wi-Fi) communication).

In an embodiment, the wearable device 100 may provide (or output) feedback (e.g., visual, auditory, or haptic feedback) corresponding to the state of the wearable device 100 according to a control signal received from the electronic device 210. For example, the wearable device 100 may provide visual feedback through the light unit and auditory feedback through the sound output module. The wearable device 100 may include a haptic module and provide haptic feedback as vibration to the body of the user through the haptic module. The electronic device 210 may also provide (or output) feedback (e.g., visual feedback, auditory feedback, or haptic feedback) corresponding to the state of the wearable device 100.

In an embodiment, the electronic device 210 may present a personalized exercise goal to the user in the exercise assistance mode. The personalized exercise goal may include respective target amounts of exercise for exercise types (e.g., strength exercise, balance exercise, and aerobic exercise) desired by the user, determined by the electronic device 210 and/or the server 230. When the server 230 determines a target amount of exercise, the server 230 may transmit information on the determined target amount of exercise to the electronic device 210. The electronic device 210 may personalize and present the target amounts of exercise for the exercise types, such as strength exercise, aerobic exercise, and balance exercise, according to a desired exercise program (e.g., squat, split lunge, or a lunge and knee up) and/or the physical characteristics (e.g., the age, height, weight, and BMI) of the user. The electronic device 210 may display a GUI screen displaying the target amounts of exercise for the respective exercise types on a display.

In an embodiment, the electronic device 210 and/or the server 230 may include a database in which information on a plurality of exercise programs to be provided to the user through the wearable device 100 is stored. To achieve an exercise goal of the user, the electronic device 210 and/or the server 230 may recommend an exercise program suitable for the user. The exercise goal may include, for example, at least one of muscle strength improvement, physical strength improvement, cardiovascular endurance improvement, core stability improvement, flexibility improvement, or symmetry improvement. The electronic device 210 and/or the server 230 may store and manage the exercise program performed by the user, the results of performing the exercise program, and the like.

According to an embodiment, the electronic device 210 may evaluate the walking ability of the user by interoperating with the wearable device 100. For example, the electronic device 210 may estimate a gait index, which is an index representing the gait state of the user, based on sensor data obtained from a sensor module of the wearable device 100 worn by the user. The gait index may be a criterion for determining the quality of a gait performed by the user. The gait index estimated by the electronic device 210 may include, for example, at least one of the walking speed, step time, step length, and stride length, walking distance, gait symmetry index, gait variability index, or walk ratio. The electronic device 210 may calculate a gait index in real-time while the user wears the wearable device 100 and walks. The step length and stride length are described in detail below with reference to FIG. 10.

When the user walks (or exercises) wearing the wearable device 100, the wearable device 100 may obtain sensor data including motion information on the user walking using sensors and transmit the obtained sensor data to the electronic device 210. The electronic device 210 may estimate walking evaluation information of the user based on the sensor data and provide the estimated walking evaluation information to the user. The walking evaluation information may include, for example, various gait indexes (e.g., the walking speed, step time, stride length, gait symmetry index, gait variability index, and walk ratio) related to the walking of the user when the user wears the wearable device 100 and walks. The electronic device 210 may provide the user with feedback information for improving the walking state of the user based on the walking evaluation information. For example, when it is determined that the measured stride length of the user is less than the desired stride length, the electronic device 210 may suggest walking with a wider stride length to the user.

The wearable device 100 and the electronic device 210 may estimate a gait index such as the walking speed using an angle sensor (e.g., the angle sensor 125) and an IMU (e.g., the IMU 135) of the wearable device 100 without using a global positioning system (GPS) sensor for tracking a location of the user so that the gait index may be estimated indoors and outdoors. In addition, the wearable device 100 and the electronic device 210 may estimate a gait index even when the user walks at a fixed location, such as on a treadmill, and may estimate the gait index by reflecting the individual characteristics of the user. The electronic device 210 may provide evaluation information on the walking state of the user to the user using the wearable device 100 and accordingly, may increase the interest of the user in walking or exercise.

Figure 4:
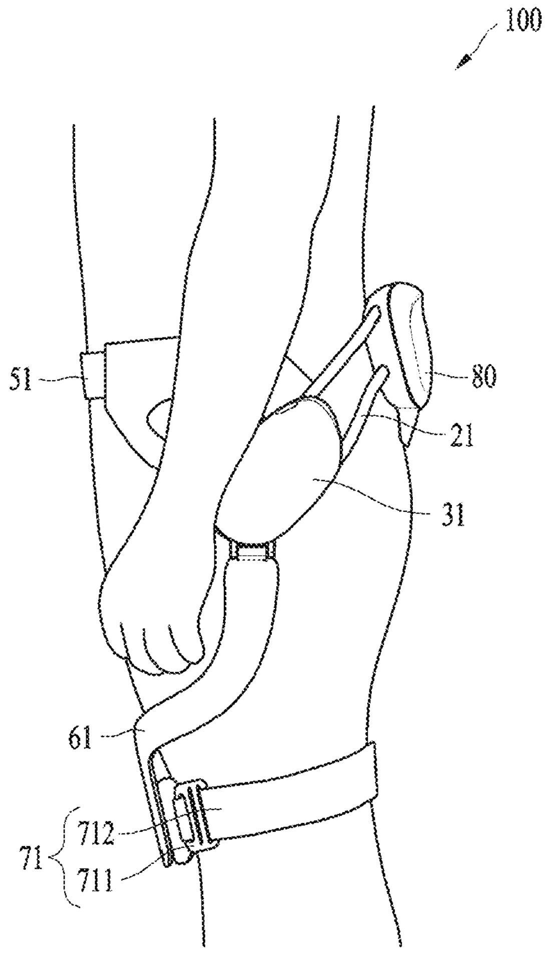
FIG. 4 is a left side view of the motion assist device according to an example embodiment.

FIG. 3 is a rear schematic diagram of the motion assist device according to an embodiment and FIG. 4 is a left side view of the motion assist device according to an embodiment.

Referring to FIGS. 3 and 4, according to an embodiment, the wearable device 100 may include the base body 80, the connection frames 21 and 22, the driving modules 31 and 32, waist frames 41 and 42, waist belts 51 and 52, the leg frames 61 and 62, and thigh fasteners 71 and 72. In an embodiment, at least one of the components may be omitted from the wearable device 100, or one or more other components (e.g., a haptic module) may be added to the wearable device 100.

The base body 80 may be on the lumbar region of the user when the user wears the wearable device 100. The base body 80 worn on the lumbar region of the user may provide a cushioning feeling to the waist of the user and support the waist of the user. The base body 80 may be hung on the hip region (an area of the hips) of the user to prevent or reduce a chance of the wearable device 100 from separating downward due to gravity while the user is wearing the wearable device 100. The base body 80 may distribute some of the weight of the wearable device 100 to the waist of the user while the user is wearing the wearable device 100. The base body 80 may be connected, directly or indirectly, to the connection frame 20. A connecting element (not shown) that may be connected to, directly or indirectly, the connection frame 20 may be provided at both end portions of the base body 80.

The connection frames 21 and 22 may extend from both end portions of the base body 80. The lumbar region of the user may be accommodated inside of the connection frames 21 and 22. The connection frames 21 and 22 may include at least one rigid body beam. The connection frames 21 and 22 may include the first connection frame 21 extending from one end portion of the base body 80 and the second connection frame 22 extending from the other end portion of the base body 80. The first connection frame 21 and the second connection frame 22 may each include a plurality of beams. Each beam may have a curved shape having a preset curvature to surround the lumbar region of the user. The driving modules 31 and 32 may be connected, directly or indirectly, to the connection frames 21 and 22.

In an embodiment, a control module, an IMU (not shown) (e.g., the IMU 135 of FIG. 1), a communication module (not shown), and a battery (not shown) may be disposed inside of the base body 80. The base body 80 may protect the control module, the IMU, the communication module, and the battery. The control module may generate a control signal for controlling the operation of the wearable device 100. The control module may include a control circuit including a processor, comprising processing circuitry, to control actuators of the driving modules 31 and 32 and memory. The control module may further include a power supply module (not shown) to supply power from the battery to each of the components of the wearable device 100.

In an embodiment, the wearable device 100 may include a sensor module (not shown) configured to obtain sensor data from one or more sensors. The sensor module may obtain sensor data that changes according to the motion of the user. In an embodiment, the sensor module may obtain sensor data including motion information of the user and/or motion information of the components of the wearable device 100. The sensor module may include, for example, an IMU (e.g., the IMU 135 of FIG. 1) to measure an upper body motion value of the user or a motion value of the connection frame 20, and an angle sensor (e.g., the angle sensor 125 of FIG. 1) to measure a hip joint angle value of the user or a motion value of the leg frames 61 and 62 but is not limited thereto. For example, the sensor module may further include at least one of a position sensor, a temperature sensor, a bio signal sensor, and a proximity sensor.

The waist frames 41 and 42 may be connected, directly or indirectly, to the driving modules 31 and 32. The waist frames 41 and 42 may surround at least a portion of the waist of the user. The waist frames 41 and 42 may include a more rigid material than the waist belts 51 and 52. The waist frames 41 and 42 may include the first waist frame 41 connected, directly or indirectly, to the first driving module 31 and the second waist frame 42 connected, directly or indirectly, to the second driving module 32. The waist frames 41 and 42 may support the waist belts 51 and 52.

The waist belts 51 and 52 may be in front of the waist of the user. The waist belts 51 and 52 may include a Velcro structure of the user. The waist belts 51 and 52 may include the first waist belt 51 connected to, directly or indirectly, the first waist frame 41 and the second waist belt 52 connected to, directly or indirectly, the second waist frame 42. One of the first waist belt 51 and the second waist belt 52 may have a hook surface and the other one may have a loop surface.

The driving modules 31 and 32 may generate the external force (or torque) to be applied to the body of the user based on a control signal generated by a control module. For example, the driving modules 31 and 32 may generate the assistance force or the resistance force to be applied to the legs of the user. In an embodiment, the driving modules 31 and 32 may include the first driving module 31 disposed in a position corresponding to a position of the left hip joint of the user and the second driving module 32 disposed in a position corresponding to a position of the right hip joint of the user. The first driving module 31 may include a first actuator and a first joint member and the second driving module 32 may include a second actuator and a second joint member. The first actuator may provide power to be transmitted to the first joint member and the second actuator may provide power to be transmitted to the second joint member. Each of the first actuator may include a motor that generates power (or torque) by receiving power from a battery. When the motor is driven by receiving power, the motor may generate the force (the assistance force) to assist the body motion of the user or the force (the resistance force) to impede the body motion of the user. In an embodiment, a control module may adjust the intensity and direction of the force generated by the motor by adjusting a voltage and/or a current supplied to the motor.

In an embodiment, the first joint member and the second joint member may receive power from the first actuator and the second actuator, respectively, and may apply the external force to the body of the user based on the received power. The first joint member and the second joint member may be disposed at positions corresponding to the joint portions of the user, respectively. One side of the first joint member may be connected, directly or indirectly, to the first actuator, and the other side of the first joint member may be connected, directly or indirectly, to the first leg frame 61. The first joint member may be rotated by power received from the first actuator. An encoder or a Hall sensor operatable as an angle sensor to measure a rotation angle (corresponding to the joint angle of the user) of the first joint member may be disposed on one side of the first joint member. One side of the second joint member may be connected, directly or indirectly, to the second actuator, and the other side of the second joint member may be connected, directly or indirectly, to the second leg frame 62. The second joint member may be rotated by power received from the second actuator. An encoder or a Hall sensor operatable as an angle sensor to measure a rotation angle of the second joint member may be disposed on one side of the second joint member.

In an embodiment, the first actuator may be disposed in a lateral direction of the first joint member and the second actuator may be disposed in a lateral direction of the second joint member. The rotation axis of the first actuator and the rotation axis of the first joint member may be spaced apart from each other, and the rotation axis of the second actuator and the rotation axis of the second joint member may also be spaced apart from each other. However, embodiments are not limited thereto, and the actuator and the joint member may share the rotation axis. In an embodiment, each actuator may be spaced apart from each joint member. In this case, the driving modules 31 and 32 may further include a power transmission module (not shown) that transmits power from the actuator to the joint member. The power transmission module may be a rotary body, such as a gear, or a longitudinal member, such as a wire, a cable, a string, a spring, a belt, or a chain. However, the scope of embodiments is not limited by a power transmission structure and a positional relationship between the actuators and joint members described above.

In an embodiment, the leg frames 61 and 62 may be located along the legs (e.g., the thighs) of the user when the wearable device 100 is worn on the legs of the user. The leg frames 61 and 62, for example, may transmit power (torque) generated by the driving modules 31 and 32 to the thighs of the user. The power generated by the driving modules 31 and 32 may act as the external force to be applied to the leg motion of the user. One end portion of the leg frames 61 and 62 may be connected, directly or indirectly, to the joint member to rotate, and as the other end portions of the leg frames 61 and 62 are connected, directly or indirectly, to the thigh fasteners 71 and 72, the leg frames 61 and 62 may transmit the power generated by the driving modules 31 and 32 to the thighs of the user. For example, the leg frames 61 and 62 may push or pull the thighs of the user. The leg frames 61 and 62 may extend in a longitudinal direction of the thighs of the user. The leg frames 61 and 62 may be bent to surround at least a portion of the circumference of the thighs of the user. Upper portions of the leg frames 61 and 62 may cover side surfaces of the thighs of the user and lower portions of the leg frames 61 and 62 may cover front surfaces of the thighs of the user. Central portions of the leg frames 61 and 62 may have a twisted shape. The leg frames 61 and 62 may include the first leg frame 61 to support the left leg of the user and the second leg frame 62 to support the right leg of the The thigh fasteners 71 and 72 may be connected, directly or indirectly, to the leg frames 61 and 62 and may fix the leg frames 61 and 62 to the thighs of the user. The thigh fasteners 71 and 72 may include the first thigh fastener 71 to fix the first leg frame 61 to the left thigh of the user and the second thigh fastener 72 to fix the second leg frame 62 to the right thigh of the user.

In an embodiment, the first thigh fastener 71 may include a first fastening frame 711 and a first strap 712, and the second thigh fastener 72 may include a second fastening frame and a second strap. The first fastening frame 711 and the second fastening frame may apply a torque generated from the driving modules 31 and 32 to the thighs of the user. The first fastening frame 711 and the second fastening frame may be disposed on one side of the thighs of the user and may push or pull the thighs of the user. The first fastening frame 711 and the second fastening frame, for example, may be disposed on the front of the thighs of the user. The first fastening frame 711 and the second fastening frame may be disposed in a circumferential direction of the thighs of the user. The first fastening frame 711 and the second fastening frame may extend to both sides around the other end portion of the leg frames 61 and 62 and may include a curved surface corresponding to the thighs of the user. One end of the first fastening frame 711 and the second fastening frame may be connected, directly or indirectly, to the leg frames 61 and 62, and the other end thereof may be connected, directly or indirectly, to a strap.

The first strap 712 may surround the rest of the left thigh of the user that is not surrounded by a first cover and the first fastening frame 711 in the circumference of the left thigh of the user, and the second strap may surround the rest of the right thigh of the user that is not surrounded by a second cover and the second fastening frame in the circumference of the left thigh of the user. The first strap and second strap may include, for example, an elastic material (e.g., a band).

Figure 5:
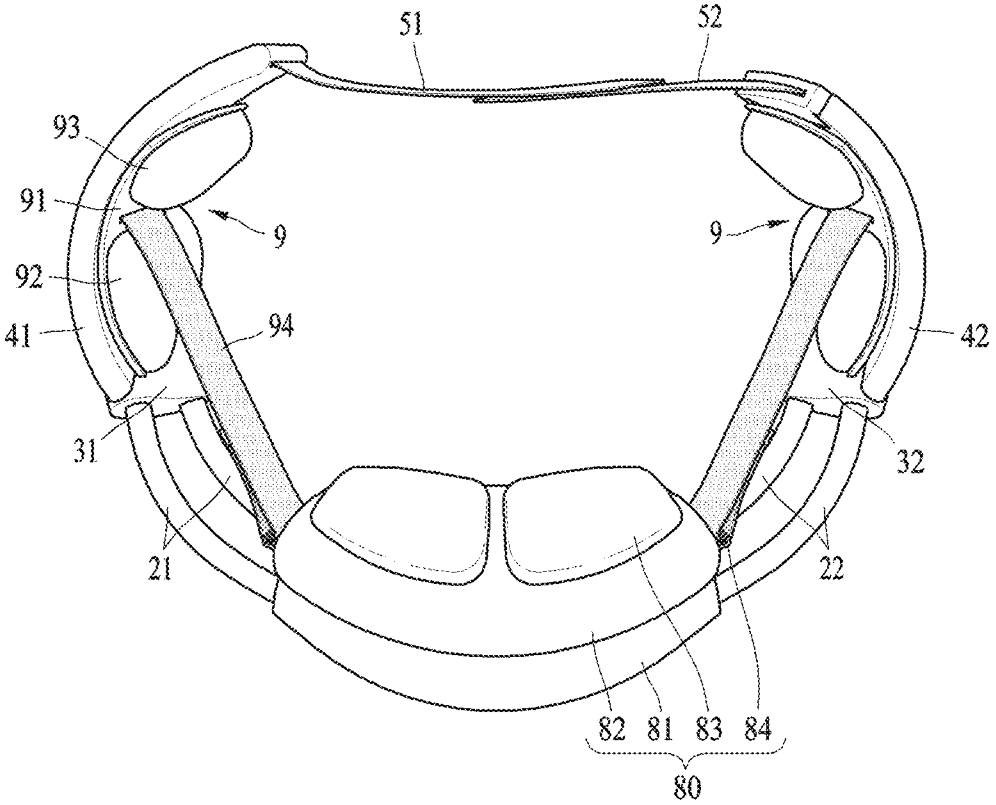
FIG. 5 is a plan view of the motion assist device according to an example embodiment.
Figure 6:
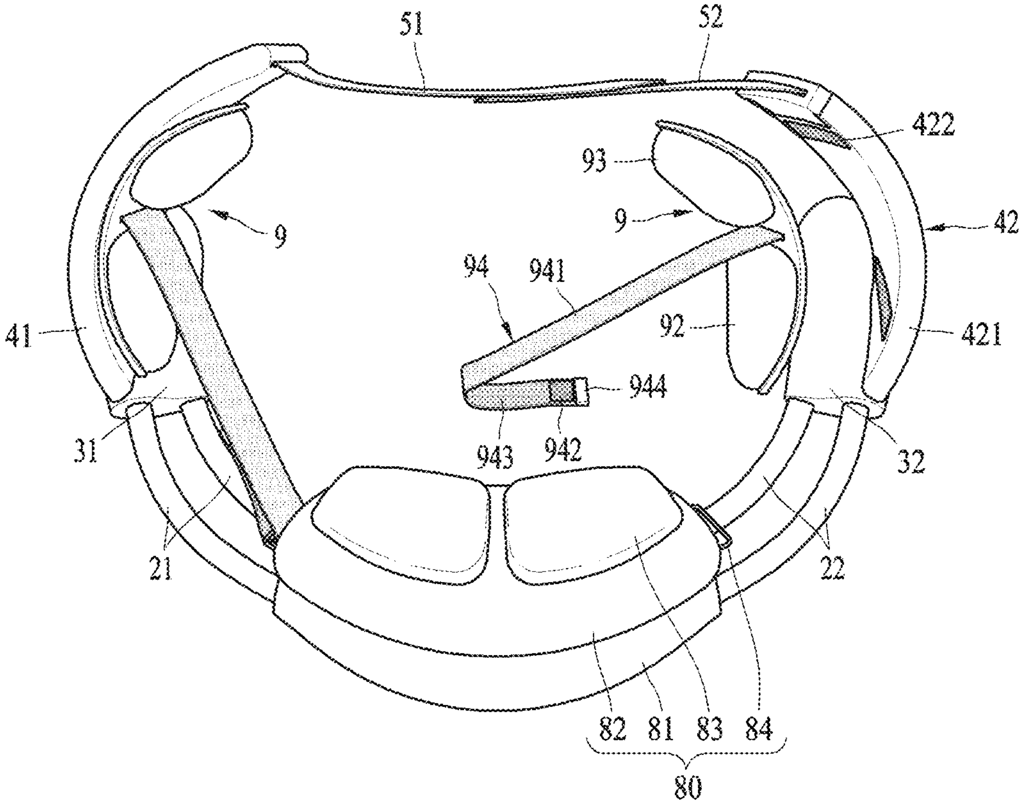
FIG. 6 is a plan view of the motion assist device according to an example embodiment, illustrating a state in which an auxiliary part is separated from a waist frame.

FIG. 5 is a plan view of the motion assist device according to an embodiment and FIG. 6 is a plan view of the motion assist device according to an embodiment, illustrating a state in which an auxiliary part is separated from a waist frame.

Referring to FIGS. 5 and 6, a motion assist device (e.g., the wearable device 100 of FIG. 1 or the wearable device 100 of FIG. 3) may be worn on the waist of the user. The motion assist device may assist the hip joint motion of the user. The motion assist device may be worn on the waist and the thighs of the user and transmit power to the thighs of the user to assist the hip joint motion of the user. The motion assist device may include the base body 80, the connection frames 21 and 22, the driving modules 31 and 32, the waist frames 41 and 42, the waist belts 51 and 52, and leg frames (e.g., the leg frames 61 and 62 of FIG. 3), and an auxiliary part 9.

The base body 80 may support the back of the user. The base body 80 may accommodate an IMU (e.g., the IMU 135 of FIG. 1), a communication module (not shown), and a battery (not shown). The base body 80 may include a cover body 81, a main body 82, a base cushion 83, and a caught ring 84. The caught ring 84 may support a waist band 94 of the auxiliary part 9. The waist band 94 may be caught by the caught ring 84.

The connection frames 21 and 22 may be connected, directly or indirectly, to the base body 80. The connection frames 21 and 22 may include the first connection frame 21 extending in one direction from the base body 80 and the second connection frame 22 extending in the other direction from the base body 80. The first connection frame 21 may extend leftward from the base body 80 and the second connection frame 22 may extend rightward from the base body 80. The first connection frame 21 may include a pair of rigid beams. The pair of rigid beams may be spaced apart from each other. The waist band 94 may be exposed to a space between at least the pair of rigid beams. The second connection frame 22 may include a pair of rigid beams. The connection frames 21 and 22 may surround a portion where the sides and back of the user are connected.

The driving modules 31 and 32 may include the first driving module 31 connected to the first connection frame 21 and the second driving module 32 connected to the second connection frame 22. The driving modules 31 and 32 may surround the sides of the user.

The waist frames 41 and 42 may include the first waist frame 41 connected to the first driving module 31 and the second waist frame 42 connected to the second driving module 32. The waist frames 41 and 42 are shown as being connected to the driving modules 31 and 32, but the waist frames 41 and 42 may be connected to the connection frame 22 herein. The waist frames 41 and 42 may surround a portion where the sides and abdomen are connected.

The auxiliary part 9 may include a first frame detachable surface (not shown) detachably provided on the waist frame 42. The waist frame 42 may include at least one second frame detachable surface 421 or 422 detachably provided on the first frame detachable surface. The second frame detachable surfaces 421 and 422 may be provided in plurality. The second frame detachable surfaces 421 and 422 are shown as being provided as two, but the number and shape are not limited thereto. For example, the second frame detachable surfaces 421 and 422 may be formed as one on the entire inner surface.

The waist belts 51 and 52 may be connected to the waist frames 41 and 42. The waist belts 51 and 52 may include the first waist belt 51 connected to the first waist frame 41 and the second waist belt 52 connected to the second waist frame 42. The first waist belt 51 and the second waist belt 52 may be detachably provided from each other. The first waist belt 51 and the second waist belt 52 may include a hook-and-loop fastener structure. One of the first waist belt 51 and the second waist belt 52 may include a hook surface and the other one may include a loop surface. The waist belts 51 and 52 may be connected to each other in the front of the abdomen of the user.

The auxiliary part 9 may be detachably provided on the waist frames 41 and 42. The auxiliary part 9 may be detachably connected to the base body 80. The auxiliary part 9 may improve wearability by being in close contact with the waist of the user and applying pressure to the waist of the user. Depending on the convenience of the user, the motion assist device may be used in a state in which the auxiliary part 9 is separated from the waist frames 41 and 42 or worn on the waist frames 41 and 42. The auxiliary part 9 may include an auxiliary frame 91, waist cushions 92 and 93, and the waist band 94.

The auxiliary frame 91 may be detachably provided on the inner surfaces of the waist frames 41 and 42. The auxiliary frame 91 may have a plate shape. The auxiliary frame 91 may have, for example, an outwardly convex shape. The auxiliary frame 91 may contact surfaces of the waist frames 41 and 42. For example, the auxiliary frame 91 may include a rigid plastic material. For example, the auxiliary frame 91 may include a material that is easily deformable.

The waist cushions 92 and 93 may be disposed on the auxiliary frame 91. The waist cushions 92 and 93 may press the waist of the user. The waist cushions 92 and 93 may be partially deformed by being pressed while the motion assist device is worn on the user.

The waist band 94 may extend from the auxiliary frame 91. The waist band 94 may be connected to the base body 80 and in close contact with the waist of the user. The waist band 94 may be spaced apart from the connection frames 21 and 22. The waist band 94 may be caught by the base body 80. The waist band 94 may be caught by the caught ring 84. The user may connect the waist band 94 to the base body 80 by passing the waist band 94 through the caught ring 84. A portion of the waist band 94 may be detachably provided to the other portion. The waist band 94 may include an elastic material. The waist band 94 may include a rubber material.

The waist band 94 may include a band body 941 connected to the auxiliary frame 91, a first band detachable surface 942 disposed on one surface of the band body 941, and a second detachable surface 943 disposed on the one surface of the band body 941 and detachably provided on the first band detachable surface 942, and a band head 944 formed at one end of the band body 941. The first band detachable surface 942 and the second detachable surface 943 may include a hook-and-loop fastener structure.

The first band detachable surface 942 may be provided at an end portion of the band body 941. The first band detachable surface 942 may include a hook surface. The second band detachable surface 943 may be entirely provided on one surface of the band body 941. The first band detachable surface 942 and the second band detachable surface 943 may be provided on an outer surface of the band body 941.

The band head 944 may be formed of a more rigid material than the band body 941. The user may easily pull the waist band 94 while gripping the band head 944. Based on a state in which the user is wearing the motion assist device, the band head 944 may be provided at a position facing the connection frames 21 and 22. That is, the band head 944 may be exposed to the connection frames 21 and 22. According to this structure, the user may adjust a position of the band head 944 by gripping the band head 944 while wearing the motion assist device completely. In addition, a problem in which the band head 944 causes discomfort while the user is wearing the motion assist device may be reduced or resolved.

Figure 7:
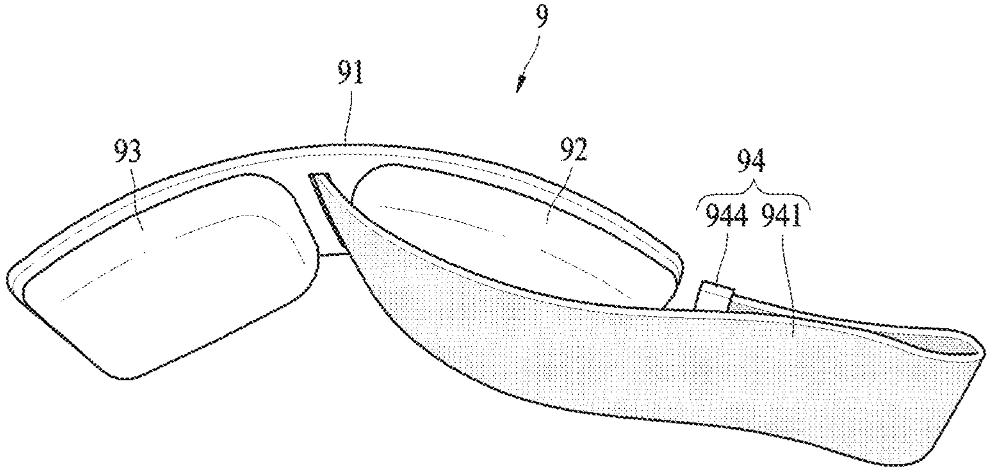
FIG. 7 is a perspective view of the auxiliary part according to an example embodiment.
Figure 8:
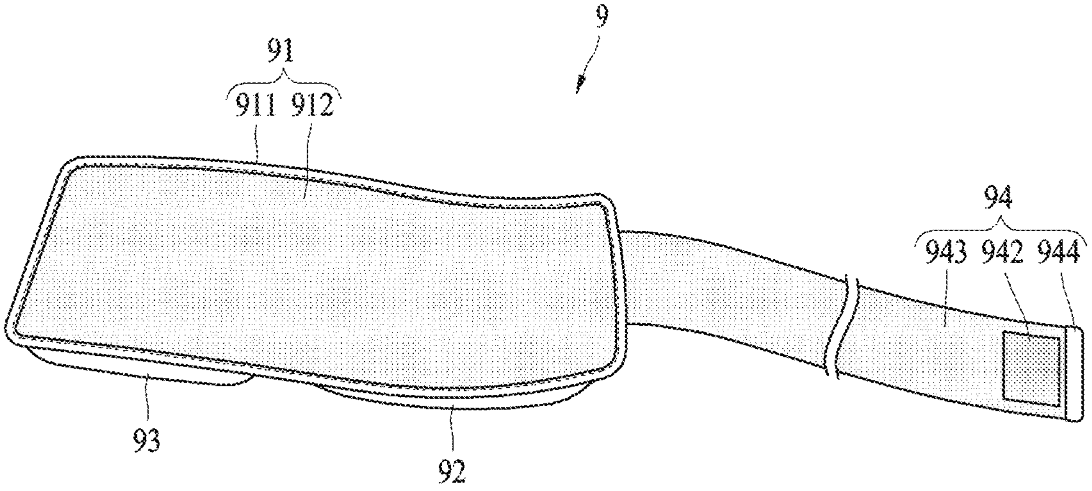
FIG. 8 is a perspective view of the auxiliary part according to an example embodiment.

FIG. 7 is a perspective view of the auxiliary part according to an embodiment and FIG. 8 is a perspective view of the auxiliary part according to an embodiment.

Referring to FIGS. 7 and 8, the auxiliary part 9 may include the auxiliary frame 91, the waist cushions 92 and 93, and the waist band 94.

The auxiliary frame 91 may include an auxiliary frame body 911 having a plate shape and a first frame detachable surface 912 disposed on, directly or indirectly, the auxiliary frame body 911. The first frame detachable surface 912 may be detachably provided on, directly or indirectly, a second frame detachable surface (e.g., the second frame detachable surfaces 421 and 422 of FIG. 6) of a waist frame (e.g., the waist frame 42 of FIG. 6).

The waist cushions 92 and 93 may be provided in a plurality spaced apart from each other in a longitudinal direction of the auxiliary frame 91. The waist band 94 may be connected between at least two adjacent waist cushions among the waist cushions 92 and 23.

According to an embodiment, a motion assist device may include a base body configured to support the back of the user, a connection frame connected, directly or indirectly, to the base body, a driving module connected, directly or indirectly, to the connection frame and configured to generate power to assist motion of the user, a leg frame rotatably connected, directly or indirectly, to the driving module and rotated by receiving power from the driving module, a waist frame connected, directly or indirectly, to the driving module, a waist belt connected, directly or indirectly, to the waist frame, and an auxiliary part detachably connected, directly or indirectly, on the waist belt, in close contact with the waist of the user, and configured to pressure the waist of the user.

According to an embodiment, the auxiliary part may be detachably connected, directly or indirectly, to the base body.

According to an embodiment, the auxiliary part may include an auxiliary frame detachably provided on, directly or indirectly, the inner surface of the waist frame, a waist cushion disposed on, directly or indirectly, the auxiliary frame and configured to press the waist of the user, and a waist band extending from the auxiliary frame, connected to the base body, and in close contact with the waist of the user.

According to an embodiment, the waist band may be spaced apart from the connection frame.

According to an embodiment, the waist band may be caught by the base body.

According to an embodiment, the waist band may include an elastic material.

According to an embodiment, the waist band may include a band body connected, directly or indirectly, to the auxiliary frame, a first band detachable surface disposed on, directly or indirectly, one surface of the band body, and a second band detachable surface disposed on, directly or indirectly, the one surface of the band body and detachably provided on, directly or indirectly, the first band detachable surface.

According to an embodiment, the first band detachable surface and the second band detachable surface may include a hook-and-loop fastener structure.

According to an embodiment, the waist band may further include a band head formed at one end of the band body and formed of a more rigid material than the band body.

According to an embodiment, based on a state in which a motion assist device is worn by a user, the band head may be provided at a position facing the connection frame.

According to an embodiment, the base body may include a caught ring configured to support the waist band.

According to an embodiment, the waist cushion may be provided in a plurality spaced apart from each other in a longitudinal direction of the auxiliary frame.

According to an embodiment, the waist band may be connected, directly or indirectly, between at least two adjacent waist cushions among the waist cushions.

According to an embodiment, the auxiliary frame may include an auxiliary frame body having a plate shape and a first frame detachable surface disposed on, directly or indirectly, the auxiliary frame body, and the waist frame may include a second frame detachable surface detachably provided on, directly or indirectly, the first frame detachably surface.

According to an embodiment, a motion assist device may include a base body configured to support the back of a user, a connection frame connected to the base body, a driving module connected to the connection frame and configured to generate power to assist the motion of the user, a waist frame connected to the driving module, and an auxiliary part including an auxiliary frame detachably provided on, directly or indirectly, the inner surface of the waist frame, a waist cushion disposed on, directly or indirectly, the auxiliary frame and configured to press the waist of the user, and a waist band extending from the auxiliary frame, connected to the base body, and in close contact with the waist of the user.

According to an embodiment, the waist band may include a band body connected to the auxiliary frame, a first band detachable surface disposed on, directly or indirectly, one surface of the band body, and a second band detachable surface disposed on, directly or indirectly, an end portion of the band body and detachably provided on, directly or indirectly, the first band detachable surface.

According to an embodiment, the first band detachable surface and the second band detachable surface may include a hook-and-loop fastener structure.

According to an embodiment, the auxiliary frame may include an auxiliary frame body having a plate shape and a first frame detachable surface disposed on, directly or indirectly, the auxiliary frame body, and the waist frame may include a second frame detachable surface detachably provided on, directly or indirectly, the first frame detachable surface.

According to an embodiment, the first frame detachable surface and the second frame detachable surface may include a hook-and-loop fastener structure.

Each embodiment herein may be used in combination with any other embodiment(s) described herein.

It should be appreciated that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., by wire), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums. Embodiments as set forth herein may be implemented as software including one or more instructions that are stored in a storage medium (e.g., the memory 514) that is readable by a machine. For example, a processor of the machine may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wearable motion assist device comprising:

a base body configured to support a back of a user of the wearable motion assist device;

at least one connection frame connected to the base body;

at least one driving module, comprising a motor and/or circuitry, connected to a respective of the at least one connection frame and configured to generate power to assist motion of the user;

at least one leg frame rotatably connected to a respective of the at least one driving module and configured to be rotated and/or pivoted based on receiving power from the at least one driving module;

at least one waist frame;

at least one waist belt connected to the at least one waist frame; and an auxiliary part detachably connected to the at least one waist belt, and configured to be in close contact with a waist of the user and to press the waist of the user, wherein the auxiliary part comprises:

an auxiliary frame detachably provided on an inner surface of the at least one waist frame;

a waist cushion disposed on the auxiliary frame and configured to press the waist of the user; and a waist band extending from the auxiliary frame, connected to the base body, and configured to be in close contact with the waist of the user.

2. The motion assist device of claim 1, wherein the auxiliary part is detachably connected to the base body.

3. The motion assist device of claim 1, wherein the waist band is spaced apart from the at least one connection frame.

4. The motion assist device of claim 1, wherein the waist band is capable of being caught by the base body.

5. The motion assist device of claim 1, wherein the waist band comprises elastic material.

6. The motion assist device of claim 1, wherein the waist band comprises:

a band body connected to the auxiliary frame;

a first band detachable surface disposed on a surface of the band body; and a second band detachable surface disposed on the surface of the band body and detachably provided on the first band detachable surface.

7. The motion assist device of claim 6, wherein the first band detachable surface and the second band detachable surface comprise a hook-and-loop fastener structure.

8. The motion assist device of claim 6, wherein the waist band further comprises a band head formed at one end of the band body and formed of a more rigid material than the band body.

9. The motion assist device of claim 8, wherein the band head is provided at a position facing the connection frames based on a state in which the motion assist device is to be worn by the user.

10. The motion assist device of claim 1, wherein the base body comprises a ring configured to support the waist band.

11. The motion assist device of claim 1, wherein the waist cushion comprises a plurality of waist cushions that are spaced apart from each other in a longitudinal direction of the auxiliary frame.

12. The motion assist device of claim 11, wherein the waist band is connected between at least two adjacent waist cushions among the waist cushions.

13. The motion assist device of claim 12, wherein the auxiliary frame comprises:

an auxiliary frame body comprising a plate shape; and a first frame detachable surface disposed on the auxiliary frame body, wherein the at least one waist frame comprises second frame detachable surfaces detachably provided on the first frame detachable surface.

14. The motion assist device of claim 13, wherein the first frame detachable surface and the second frame detachable surface comprise a hook-and-loop fastener structure.

15. A wearable motion assist device comprising:

a base body configured to support a back of a user;

connection frames connected to the base body;

driving modules, each comprising a motor and/or circuitry, respectively connected to the connection frames and configured to generate power to assist motion of the user;

waist frames respectively connected to the driving modules; and an auxiliary part comprising: an auxiliary frame detachably provided on an inner surface of at least one of the waist frames, waist cushions disposed on the auxiliary frame and configured to press a waist of the user, and a waist band extending from the auxiliary frame, connected to the base body, and configured to be in close contact with the waist of the user.

16. The motion assist device of claim 15, wherein the waist band comprises:

a band body connected to the auxiliary frame;

a first band detachable surface disposed on one surface of the band body; and a second band detachable surface disposed on the one surface of the band body and detachably provided on the first band detachable surface.

17. The motion assist device of claim 16, wherein the first band detachable surface and the second band detachable surface comprise a hook-and-loop fastener structure.

18. The motion assist device of claim 15, wherein the auxiliary frame comprises:

an auxiliary frame body; and a first frame detachable surface disposed on the auxiliary frame body, wherein the waist frames comprise second frame detachable surfaces detachably provided on the first frame detachable surface.

19. The motion assist device of claim 18, wherein the first frame detachable surface and the second frame detachable surfaces comprise a hook-and-loop fastener structure.

* * * * *